United States Patent [19]

Rouillard

[11] Patent Number: 4,903,436
[45] Date of Patent: Feb. 27, 1990

[54] GUIDE FOR A SLIDING WINDOW

[75] Inventor: Firmin Rouillard, Epinay sur Orge, France

[73] Assignee: Automobiles Peugeot and Automobiles Citroen, Neuilly sur Seine, France

[21] Appl. No.: 242,252

[22] Filed: Sep. 8, 1988

[30] Foreign Application Priority Data

Sep. 8, 1987 [FR] France .................. 87 12657

[51] Int. Cl.$^4$ ............................ E05D 15/16
[52] U.S. Cl. ........................... 49/440; 49/488
[58] Field of Search ............ 49/440, 441, 374, 375, 49/377, 378, 488

[56] References Cited

U.S. PATENT DOCUMENTS

| 4,490,942 | 1/1985 | Arnheim et al. | 49/440 X |
| 4,530,186 | 7/1985 | Guillon | 49/441 |
| 4,631,865 | 12/1986 | Motonami et al. | 49/374 |
| 4,662,113 | 5/1987 | Weaver | 49/374 X |
| 4,667,442 | 5/1987 | Hiramatsu et al. | 49/441 |
| 4,689,916 | 9/1987 | Shimizu | 49/441 X |

FOREIGN PATENT DOCUMENTS

| 2535776 | 5/1984 | France . |
| 2551129 | 3/1985 | France . |
| 2555698 | 5/1985 | France . |

Primary Examiner—Philip C. Kannan
Attorney, Agent, or Firm—Brisebois & Kruger

[57] ABSTRACT

A guide arrangement for a sliding window of a vehicle includes a generally "U" shaped guide rail secured in a frame of the window opening and a runner slidable in said guide rail and which straddles and is fixed to the an edge of the window. The runner has a thin web disposed between the outer surface of the window and an outer leg of the guide rail in which the runner slides, so that the outside surface of the window is almost flush with the outer surface of the vehicle. A weatherstrip like seal mounted on the frame of the window opening engages the window.

16 Claims, 1 Drawing Sheet

GUIDE FOR A SLIDING WINDOW

BACKGROUND AND SUMMARY OF THE INVENTION

The present invention relates to a guide for sliding glass windows of vehicles which permits obtaining an "almost-flush" window glass or panel (the glass being recessed only very slightly from the outer body panel, 5 millimeters, for example) in a manner to improve the aerodynamic characteristics while obtaining good guiding of the window glass in the frame and which can be done by simple means and at low cost. One knows in particular that poorly guided glass can jam or wedge, which can prevent complete closing of the window at high vehicle speeds.

The device and arrangement according to the invention comprises a guide or rail which is generally "U" shaped, and in which a runner or slide shoe, fixed to and straddling the window glass can slide, and is characterized by the fact that the runner comprises a thin web or plate which is disposed between the outside surface of the window glass and the outer leg or wall of the guide, and in that a gasket or weatherstrip secured to the frame of the window ensures a good seal.

There will be described, as a non-limiting example, two embodiments of the device according to the invention, with reference to the accompanying drawings.

DETAILED DESCRIPTION OF PREFERRED EMBODIMENTS

Figure 1:
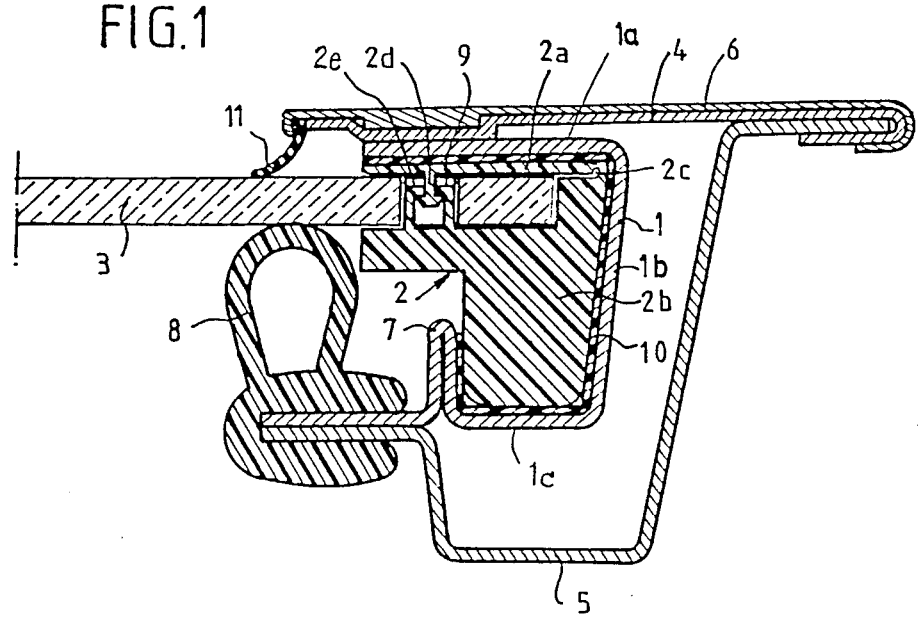
FIG. 1 is a view in horizontal section of a first embodiment according to the invention.

In the drawings there is shown a guide or metal guide rail 1 in which a runner or slide shoe 2 is disposed to slide along the rail. Runner 2 straddles a side or edge of and is fixed to a window 3, preferably of glass, which is slidable to open and close an opening of an automotive vehicle.

The guide rail 1 is generally "U" shaped and is fixed, as by welding, between an exterior panel 4 and an interior panel or sheath 5, which reinforces the structure of the window frame. The outer face of panel 4 is covered by a trim strip 6, which can be decorative.

As shown at FIG. 1, the guide rail 1 has an outer leg or wall 1a, a side leg or wall 1b, and an inner leg or wall 1c. The inner wall 1c of guide rail 1 has a reverse fold to form a perpendicular flange 7 which forms a fourth guide surface for the runner 2. The edges of the connected flanges or joints of guide rail 1 and the inner panel 5 are covered with a gasket or seal 8, which engages and seals against the inner surface of window 3.

The runner 2 is of a plastic material, for example, polyamide, and has a thin plate portion or web 2a which is connected to a body 2b by a reduced thickness portion to form a hinge 2c. A projection 2e on body 2 extends into an opening 9 in the window 3, and the inner face of the thin web 2a carries a prong 2d of a shape which enables it to snap into an opening in projection 2e to fix the runner 2 to the window 3. Thus, the runner 2 is positioned on and folded around the edge of the window, along the hinge 2c to secure the runner to the window. It can be seen at FIG. 1, that the runner 2 extends around the edge of the window and along the inside and outside surfaces of the window near the edge.

The interior of guide 1 is lined with a shaped strip 10, of for example, polypropylene which protects the paint or coating on the inside of the rail, and improves sliding of the runner. The sealing is completed by a lip seal 11 retained between the outer panel 4 and the trim strip 6. The lip of seal 11 engages the outer surface of the window. Thus, the window can slide relative to the seals 8 and 11, and the channel or rail 1 is sealed with respect to the interior and exterior of the vehicle by these seals, when the window is closed.

As shown at FIG. 1, the runner 2 has an exterior configuration that corresponds to the shape of the interior of the inside of the guide rail 1 so the runner can slide in the rail but is well guided by the surfaces of the surrounding walls 1a, 1b, and 1c, and the flange 7, of the guide rail 1.

Figure 2:
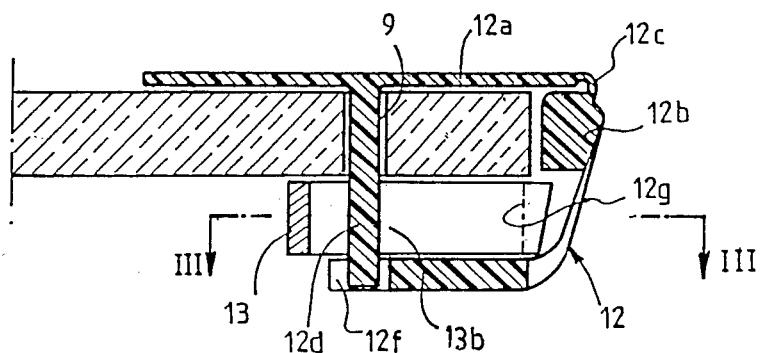
FIG. 2 is a view in horizontal section of an additional embodiment of the runner or slide shoe.
Figure 4:
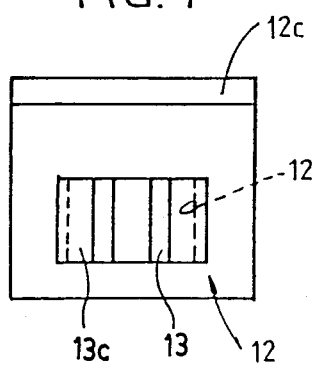
FIG. 4 is a view in side elevation of the runner or slide shoe of FIGS. 2 and 3.
Figure 3:
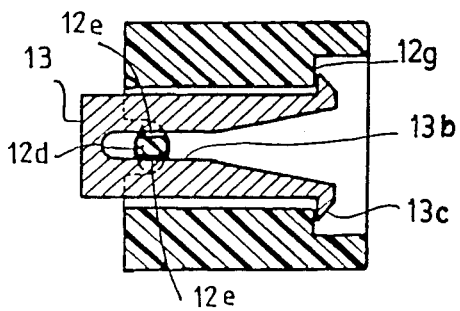
FIG. 3 is a view in vertical section taken along line III—III of FIG. 2.

In the embodiment of FIGS. 2 to 4, there is a runner 12 which, as in the first embodiment, has a thin flat plate portion or web 12a which is connected to a body 12b of the runner by a reduced thickness portion to form a hinge 12c. The inner face of the thin plate 2a carries a pin or stud 12d which has on a shank portion between its ends, two opposed flats 12e. When the pin 12d has been passed through the opening 9 in the window 3, its full size head is engaged in a notch or slot 12f of the body 12b. The pin 12d is then secured in position by a retaining clip or hook 13 which has a slot 13b between its legs which is engaged over the flats 12e of the pin 12d. The pin 12d is thus retained since its full size head cannot be withdrawn through the slot 13b. The legs of clip 13 have ends in the form of hooks 13c which snap outwardly to grip the edges 12g at the end of an opening in the body of the runner 12.

As can be seen from FIG. 4, the runner 12 has a length, as measured along the edge of the window which is greater than its thickness, as measured perpendicular to the window. The runner 2 of FIG. 1 is similarly dimensioned.

The thin web 2a or 12a permits the outside surface of the window to be very close to the inner surface of the outer wall 1a of the guide rail 1. Thus, as shown at FIG. 1, the outside surface of the window is spaced from the outside surface of panel 4 by a distance essentially equal to the combined thicknesses, of panel 4, of outer wall 1a, and of web 2a or 2b, a total distance on the order of 5 mm, so that the window is almost flush with the outside surface of the vehicle. While the web 2a or 12a is quite thin, on the order of 1 to 2 mm thick, the window is well supported, and slides with little force because of the lubricity of the plastic material of the runner, and the lining strip 10.

While only one runner is shown in the drawings, there can be several runners spaced apart along and attached to one or both side edges of the window. While the window is usually of glass or other transparent material, the arrangement of the invention can be used with an opaque panel such as the closure of a vehicle sun-roof.

Of course, the present invention is not to be considered limited to the two embodiments shown and described, but covers in addition, other variations.

What is claimed is:

1. A guide arrangement for a sliding window of a vehicle comprising, a generally "U" shaped guide rail secured in a frame of the window opening and a runner slidable in said guide rail and which straddles and is fixed to the window, said runner comprising, a thin web disposed between the outer surface of the window and an outer leg of the guide rail, and a seal mounted on the frame of the window opening for sealing against the window, and wherein, the gide rail is welded between an exterior panel and an interior panel of the vehicle.

2. A guide arrangement according to claim 1 wherein, a trim strip extends over the exterior panel, a lip seal is retained between the trim strip and the panel, and the lip seal engages the window.

3. A guide arrangement according to claim 1 wherein said guide rail further comprises, a projection forming a guide surface for said runner.

4. A guide arrangement according to claim 3 wherein, said projection comprises a folded portion of the guide rail which extends perpendicular to opposed parallel legs of the guide rail.

5. A guide arrangement according to claim 1 wherein, said runner comprises, a reduced thickness hinge connecting the thin web to a body portion of the runner.

6. A guide arrangement according to claim 1 further comprising, a projection fixed to said runner and extending into an opening formed in the window from one surface of the window, and means for securing the projection to a portion of the runner disposed on the other surface of the window.

7. A guide arrangement according to claim 6 wherein, said projection comprises, a projection on the body of the runner which extends into the opening in the window toward said thin web, and means for securing the web to the projection.

8. A guide arrangement according to claim 7 wherein, said means for securing said web to said projection comprises a snap together connection between said projection and a pin projecting from the web.

9. A guide arrangement according to claim 6 wherein, said projection comprises, a projection on the web of the runner which extends toward the body of the runner, and means for securing the projection to the body of the runner.

10. A guide arrangement according to claim 9 wherein, said means for securing the projection to the body of the runner comprises, a clip engageable over the projection and secured to the body of the runner.

11. A guide arrangement according to claim 10 wherein, said projection comprises, a projection having a head and a reduced size shank, and said clip has a slot engageable with the shank.

12. A guide arrangement according to claim 1 wherein, said rail has a lining comprised of a plastic material.

13. A guide arrangement according to claim 12 wherein, said lining comprised of a shaped strip of plastic material.

14. A guide arrangement for a sliding window of a vehicle comprising, a generally "U" shaped gide rail secured in a frame of the window opening and a runner slidable in said guide rail and which straddles and is fixed to the window, said runner comprising, a thin web disposed between the outer surface of the window and an outer leg of the guide rail, a seal mounted on the frame of the window opening for sealing against the window, an exterior panel, and wherein, a trim strip extends over the exterior panel, a lip seal is retained between the trim strip and the panel, and the lip seal engages the window.

15. A guide arrangement for a sliding window of a vehicle comprising, a generally "U" shaped guide rail secured in a frame of the window opening a runner slidable in said guide rail and which straddles and is fixed to the window, said runner comprising, a thin web disposed between the outer surface of the window and an outer leg of the guide rail, a seal mounted on the frame of the window opening for sealing against the window, a projection fixed to the web of said runner and extending into an opening formed in the window from one surface of the window, said projection extending toward the body of the runner disposed on the other surface of the window and means for securing the projection to the body of the runner and comprising, a clip engageable over the projection and secured to the body of the runner.

16. A guide arrangement according to claim 15 wherein, said projection comprises, a projection having a head and reduced size shank, and said clip has a slot engageable with the shank.

* * * * *